(12) United States Patent
Barnes

(10) Patent No.: US 11,792,319 B2
(45) Date of Patent: *Oct. 17, 2023

(54) REMOTE CONTROL OF A WEB BROWSER

(71) Applicant: Troy Barnes, Austin, TX (US)

(72) Inventor: Troy Barnes, Austin, TX (US)

( * ) Notice: Subject to any disclaimer, the term of this patent is extended or adjusted under 35 U.S.C. 154(b) by 368 days.

This patent is subject to a terminal disclaimer.

(21) Appl. No.: 16/947,218

(22) Filed: Jul. 23, 2020

(65) Prior Publication Data

US 2020/0389555 A1    Dec. 10, 2020

Related U.S. Application Data

(63) Continuation of application No. 15/350,156, filed on Nov. 14, 2016, now Pat. No. 10,735,584, which is a continuation of application No. 13/124,368, filed as application No. PCT/US2009/060920 on Oct. 15, 2009, now Pat. No. 9,497,322.

(60) Provisional application No. 61/105,850, filed on Oct. 16, 2008.

(51) Int. Cl.
| | | |
|---|---|---|
| *H04M 3/493* | (2006.01) | |
| *G06Q 30/0601* | (2023.01) | |
| *H04L 67/02* | (2022.01) | |
| *H04M 7/00* | (2006.01) | |
| *H04M 7/12* | (2006.01) | |

(52) U.S. Cl.
CPC ...... *H04M 3/4938* (2013.01); *G06Q 30/0641* (2013.01); *H04L 67/02* (2013.01); *H04M 7/006* (2013.01); *H04M 7/1295* (2013.01)

(58) Field of Classification Search
None
See application file for complete search history.

(56) References Cited

U.S. PATENT DOCUMENTS

| | | |
|---|---|---|
| 5,594,789 A | 1/1997 | Seazholtz et al. |
| 5,901,366 A | 5/1999 | Nakano et al. |
| 6,101,473 A | 8/2000 | Scott et al. |
| 6,411,690 B1 | 6/2002 | Iinuma |
| 6,522,738 B1 | 2/2003 | Cruickshank et al. |
| 6,542,740 B1 | 4/2003 | Olgaard et al. |
| 6,621,502 B1 * | 9/2003 | Nair ............... H04N 21/41407 709/206 |
| 6,718,015 B1 | 4/2004 | Berstis |
| 7,019,770 B1 | 3/2006 | Katz |
| 7,542,068 B2 | 6/2009 | Eshkoli et al. |
| 7,627,110 B2 | 12/2009 | Mow |

(Continued)

OTHER PUBLICATIONS

Office Action for U.S. Appl. No. 15/350,156, dated Jan. 4, 2018, Troy Barnes, "Remote Control of a Web Browser", 20 pages.

(Continued)

*Primary Examiner* — Mark Villena
(74) *Attorney, Agent, or Firm* — Lee & Hayes, P.C.

(57) ABSTRACT

A system for remotely and interactively controlling visual and multimedia content displayed on and rendered by a web browser using a telephony device. In particular, the system relates to receiving a voice input (e.g., dual tone multi-frequency DTMF input, spoken input, etc.) from a telephony device (e.g., a landline, a cellular telephone, or other system with telephone functionality, etc.) via a wide-area network to an intermediary computer that is configured to control the rendering of one or more web pages (or other web data) by a standard web browser.

19 Claims, 2 Drawing Sheets

System 100

(56) References Cited

U.S. PATENT DOCUMENTS

| | | |
|---|---|---|
| 2002/0111879 A1 | 8/2002 | Melero et al. |
| 2002/0123904 A1 | 9/2002 | Amengual et al. |
| 2003/0002651 A1 | 1/2003 | Shires |
| 2003/0053444 A1 | 3/2003 | Swartz |
| 2003/0119527 A1 | 6/2003 | Labun et al. |
| 2004/0117254 A1 | 6/2004 | Nemirofsky et al. |
| 2005/0058962 A1 | 3/2005 | Siemons et al. |
| 2005/0262535 A1 | 11/2005 | Uchida et al. |
| 2005/0283257 A1 | 12/2005 | Bisbee et al. |
| 2006/0041926 A1 | 2/2006 | Istvan et al. |
| 2006/0061555 A1 | 3/2006 | Mullen |
| 2006/0147003 A1 | 7/2006 | Archacki et al. |
| 2006/0227761 A1 | 10/2006 | Scott et al. |
| 2007/0047718 A1 | 3/2007 | Idler et al. |
| 2007/0078717 A1 | 4/2007 | Ho et al. |
| 2007/0118857 A1 | 5/2007 | Chen et al. |
| 2007/0123251 A1 | 5/2007 | McElvaney |
| 2007/0178891 A1 | 8/2007 | Louch et al. |
| 2007/0250567 A1 | 10/2007 | Graham et al. |
| 2008/0129816 A1 | 6/2008 | Mattila et al. |
| 2008/0235578 A1 | 9/2008 | Heed et al. |
| 2008/0263139 A1 | 10/2008 | Martin |
| 2008/0275785 A1 | 11/2008 | Altberg et al. |
| 2008/0298560 A1 | 12/2008 | Purdy et al. |
| 2009/0003312 A1 | 1/2009 | Velazquez et al. |
| 2009/0070798 A1 | 3/2009 | Lee et al. |
| 2009/0109055 A1 | 4/2009 | Burch et al. |
| 2009/0112967 A1 | 4/2009 | Amano et al. |
| 2009/0132487 A1 | 5/2009 | Lev |
| 2009/0150764 A1 | 6/2009 | Farrell et al. |
| 2009/0161842 A1 | 6/2009 | Sylvain |
| 2009/0213081 A1 | 8/2009 | Case, Jr. |
| 2010/0057882 A1 | 3/2010 | Haartsen et al. |
| 2010/0083338 A1 | 4/2010 | Chiang |
| 2010/0122334 A1 | 5/2010 | Stanzione et al. |
| 2011/0145868 A1 | 6/2011 | Hultkrantz |
| 2017/0126890 A1 | 5/2017 | Barnes |

OTHER PUBLICATIONS

Final Office Action dated Dec. 16, 2019 for U.S. Appl. No. 15/350,156 "Remote Control of a Web Browser" Barnes, 11 pages.
Office Action for U.S. Appl. No. 15/350,156, dated May 30, 2019, Troy Barnes, "Remote Control of a Web Browser", 24 pages.
Office Action for U.S. Appl. No. 15/350,156, dated Jul. 27, 2018, Barnes, "Remote Control of a Web Browser", 22 pages.
Written Opinion in International Application No. PCT/US2009/060920 dated Apr. 19, 2010, 4 pages.

* cited by examiner

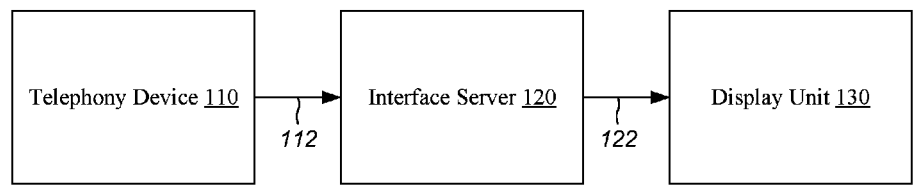
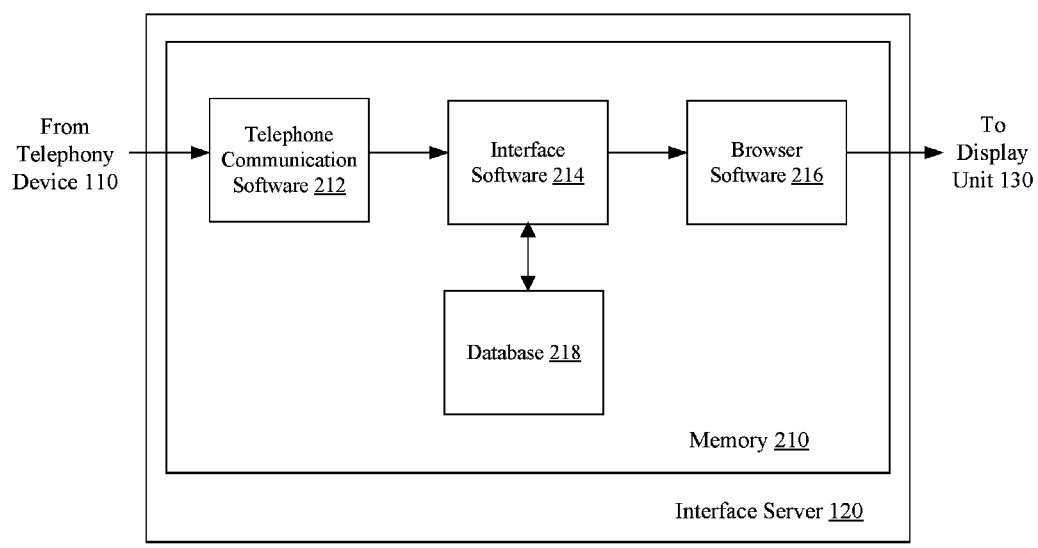

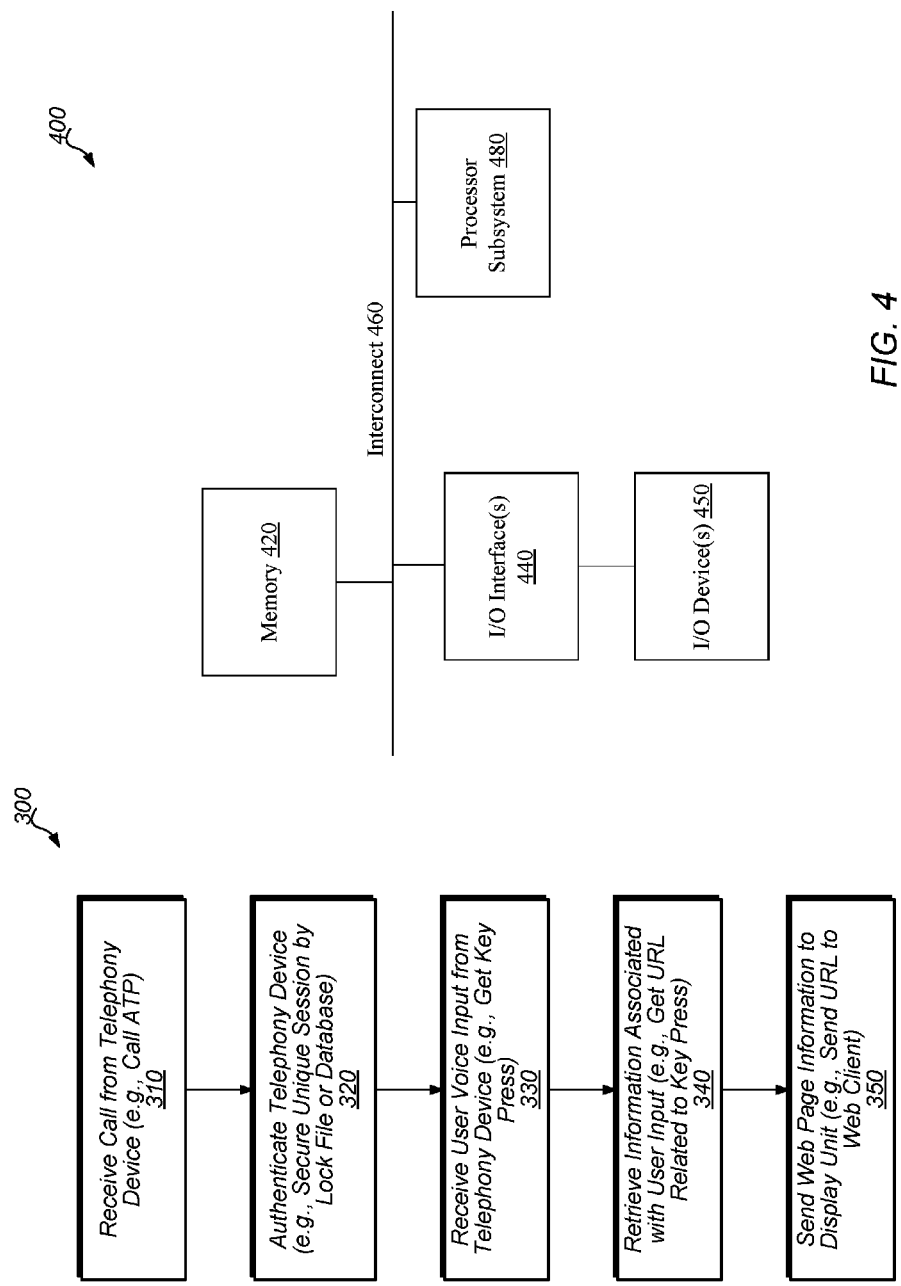

REMOTE CONTROL OF A WEB BROWSER

CROSS-REFERENCE TO RELATED APPLICATION(S)

This application is a continuation of and claims priority to U.S. application Ser. No. 15/350,156, filed on Nov. 14, 2016 and entitled "REMOTE CONTROL OF A WEB BROWSER," issuing as U.S. Pat. No. 10,735,584 on Aug. 4, 2020, which is a continuation of and claims priority to U.S. application Ser. No. 13/124,368, filed on Apr. 14, 2011 and entitled "REMOTE CONTROL OF A WEB BROWSER" and issued as U.S. Pat. No. 9,497,322 on Nov. 15, 2016, which is a U.S. national stage application under 35 USC § 371 of International Application No. PCT/US2009/060920 filed on Oct. 15, 2009 and entitled "REMOTE CONTROL OF A WEB BROWSER" which claims priority to Provisional Application No. 61/105,810 filed on Oct. 16, 2008 and entitled "REMOTE CONTROL OF A WEB BROWSER," the entirety of which are incorporated herein by reference.

BACKGROUND

Technical Field

The present disclosure relates to a software system and method for controlling the display or other operation of a web page displayed in a browser in response to external command data submitted from a telephone in DTMF, voice, or other form.

Description of the Related Art

Web browsers have been used for many years now, as have telephones. Both have evolved from relatively primitive inventions to complex creations, yet fundamentally they perform much of the same duties today, as they did at the time of their introduction, namely to efficiently transmit information from a source to a recipient.

Since the inception of the web browser, many improvements have been made, enabling the transmittal of increasingly complex data to and from a web server. The data transmitted can include text, images, audio, video, etc. (even tactile information if a client computer is properly equipped). The popularity of the web has made web content available in a plethora of locations besides standard computer displays. For example, with the decline in electronic component prices, even plasma displays and other multimedia-capable display devices are able to display web page data using incorporated web rendering software.

The inventor has recognized that current implementations of interactive voice response systems (IVRs) are inconvenient to users, particularly because of the inconvenience associated with not being able to visualize current available choices when using an IVR system. Additionally, in such systems, time is wasted when IVR prerecorded information is read to a user over the phone at a pace that is slower than what may be necessary for that particular user, resulting in frustration and inefficiency.

SUMMARY

The present disclosure describes various techniques for controlling the display of a web page using a telephony device. In one embodiment, a computer system is configured to receive voice input (e.g., dual tone multi-frequency DTMF input, spoken input, etc.) from a telephony device (e.g., a landline, a cellular telephone, or other system with telephone functionality, etc.) over a wide-area network (e.g., a public switched telephone network, voice over IP network, etc). The computer system is also configured to, in response to the received voice input, control the content of one or more web pages displayed on a display unit coupled to the computer system. For example, the computer system may update content of at least one of the one or more web pages.

In some embodiments, the received voice input is made in response to a visual prompt provided by the computer system via the display unit. In other embodiments, the received voice input is made in response to a voice prompt provided by the computer system via the telephony device. In some embodiments, the computer system is usable with a telephony-based customer service interactive voice response (IVR) system, where at least one of the one or more web pages includes information corresponding to options available via the IVR system, and where the web page is updatable in real time based on the received voice input.

BRIEF DESCRIPTION OF THE DRAWINGS

FIG. 1. illustrates one embodiment of an automated telephony project (ATP) system.

FIG. 2. illustrates one embodiment of an interface server.

FIG. 3. illustrates one embodiment of a method performed by an ATP system.

FIG. 4 is one embodiment of a computer system on which various methods described by the present disclosure can be practiced.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIG. 1 illustrates one embodiment of an automated telephony project (ATP) system 100 that enables a user (e.g., of a telephone) to control a web page (e.g., control content that is displayed on a corresponding display unit). In the illustrated embodiment, ATP system 100 includes a telephony device 110, interface server 120 (which can be any suitable computer system), and display unit 130. Telephony device 110 is coupled to server 120 via interconnect 112, and server 120, in turn, is coupled to display unit 130 via interconnect 122. In some embodiments, server 120 and display unit 130 may be implemented within a single housing.

In one embodiment, interface server 120 receives input from telephony device 110 and controls a web page (e.g., by controlling the rendering of content presented on display unit 120 responsive to the input from telephony device 110). In some embodiments, the received input from telephony device 110 is voice input. (As used herein, a "voice input" refers to any type of traffic that is communicated over a voice communication channel of telephony device 110 (as opposed to a channel for communicating data traffic). A voice input may include information indicative of a signal corresponding to the user's voice. A voice input may also include a tone signal that is generated by telephony device 110 responsive to a user pressing a key on a keypad e.g., dual-tone multi-frequency (DTMF) tone signals). In one embodiment, a user provides a voice input responsive to a prompt from interface server 120. In some embodiments, the prompt is a voice prompt sent via interconnect 112; in other embodiments, the prompt is a visual prompt displayed on display unit 130. In various embodiments, system 100 provides real-time visual feedback to the user by rendering a web page in a web browser such that the user can view the changes on display unit 130 (thus permitting a user-initiated, interactive session from any telephony device).

As used herein, a "telephony device" is any suitable device that is configured to initiate and receive telephone calls, including, without limitation cellular phones, standard landline phones, satellite phones, computing devices with telephone functionality, VoIP devices, etc. A telephony device may be either an analog or digital telephony device, without limitation.

In one embodiment, the user of telephony device 110 initiates a telephone call over interconnect 112. In one embodiment, interconnect 112 is a wide-area network. (As used herein, a "wide-area network" refers a communications network that covers a broad area (as opposed to a local-area network)). In some embodiments, interconnect 112 includes a public switched telephone network (PSTN), public voice over IP (VoIP) network, etc. Telephony device 110 may be configured to communicate voice traffic via a voice channel. For example, telephony device 110 may have an interface for a user to send and receive audio data, such as a microphone and speaker, and may have a numbered keypad label with the digits 0 through 9, and the special keys * and #. In various embodiments, the keypad is used to initiate telephone calls and to control web pages shown on display unit 130. Telephony device 110 may also be configured to communicate data traffic (e.g., email data, web traffic, etc.) via a data channel that is distinct from the voice channel.

Interface server 120, in one embodiment, serves as a gateway between the telephony device 110 domain and the World Wide Web. Interface server 120 may take various forms including a personal computer system, a desktop computer, a mainframe computer, a parallel architecture system comprised of one of more of these, or any other suitable device. Interface server 120 may operate singly or in a clustered or networked configuration known commonly as a "server farm."

In one embodiment, interface server 120 may implement an interactive voice response (IVR) functionality over a PSTN or VoIP network. In certain embodiments, the system allows the caller to visually inspect their selection(s) on display unit 130.

Display unit 130 may be any of a variety of display devices such as a computer monitor, a television, or any other display devices. In various embodiments, a single display unit 130 may (or may not) be usable by a plurality of users simultaneously. To regulate the control of the display unit 130, display unit 130 may have a unique identifier code that is displayed by display unit 130 and associated with the display unit 130. In various embodiments, the unique identifier code is generated by interface server 120. Thus, a particular display device may have a label on it (e.g., a number or other identifier). Accordingly, in some embodiments, when a user calls into server 120, the user may provide a unique identifier of a particular display unit 130, and server 120 is configured to use the identifier to select the particular display unit 130 from among other display units 130.

Various (non-limiting) embodiments of ATP system 100 are described below.

ATP as a Web Service

ATP system 100, in one embodiment, is a web service for controlling the content displayed on a web page. ATP-associated web pages can correspond with and supplement voice-only IVR systems. For example, the URLs of web pages that may be displayed may be stored in a hierarchical database with search keys created from the sequence of DTMF key presses that have been received.

When the user is on a particular ATP homepage, they may be prompted to click a button for support. They may then be redirected to a page such as verizon.sucasita.com, which displays a unique 3-digit code. The user calls the telephone number that is displayed on the screen and enters this 3-digit code. The server may associate the 3-digit code along with the browsers session id number to create a unique server-browser connection that can now be controlled via the phone that called the telephone number.

In one embodiment, ATP system 100 may "listen" in to a 3-way call (e.g., ATP system 100 may be "3-wayed" into a particular call by a particular company, e.g., to a customer service hotline). When an end user calls a company associated with system 100, another phone call may be made from an IVR to system 100. In one embodiment, an IVR may be in passive mode and listen for DTMF presses or voice input. Database lookups for each DTMF entry may be done to determine where in the IVR hierarchy the user is. The relevant page OR a URL to a page is retrieved from a database and is presented to the user's browser (e.g., via AJAX). Thus, in some embodiments, server 120 is configured to listen for voice input in a telephone call (e.g., a 3-way call), where the telephone call may be between the telephony device 110 and another telephony device distinct from server 120.

ATP as a Standalone Hardware Product

ATP system 100, in one embodiment, can be made as a standalone product by storing the requisite software in a small computer with a voice modem that has caller id. This ATP appliance can be affixed to the back of an LCD or can sit on the floor beneath the LCD. The software on the ATP appliance may be encrypted to protect copyright and trade secrets.

Various ATP Uses

ATP system 100, in one embodiment, has the potential to completely change the landscape of advertising. ATP takes the best of advertising driven by search and places it in the place where retail transactions occur. ATP may complete a sale up to a certain ceiling value for items. Certain embodiments thus permit the display of a website right at the store that is tailored to the shopper.

The system serves a number of functions, including, but not limited to:

ATP system 100, in one embodiment, allows visual representation of hard-to-understand IVR menus, by serving as a liaison between the called company and the caller. ATP's servers handle what information, text, graphics, multimedia or other presentation aids that are given during the clients IVR script.

ATP system 100, in one embodiment, may be configured to provide assistance to the visually impaired. For example, in situations where a visually-impaired individual needs access to web content that is on a display device, the individual could call ATP system 100, and system 100 could read the content shown on the display device to the individual (e.g., using a self-voicing application such as FireVox by Charles L. Chen). Accordingly, in some embodiments, server 120 is configured to provide audio information to telephony device 110, where the audio information indicates content included within a web page. For example, the audio information may be text read from a web page, a description of picture on the web page, etc.

ATP system 100, in one embodiment, connects users with their accumulated profiles. Whether a user is in Dusseldorf, Germany or Austin, Tex., the user's profile is available over the ATP network. Local retailers can tap into the ATP database for the user's profile—but only when access is granted when the user enters the screen's 3-digit code while at the retailer's establishment. For example, ATP system 100 may store information about a user's previous purchases or a user's preferences in a user's profile. ATP system 100 may then allow a user to quickly order previously purchased items from a peripheral ATP kiosk and to make a payment. By the time the user reaches the store, the order can be ready to go. Thus, in some embodiments, server 120 is configured to receive input specifying information about a user of telephony device 110. Then, server 120 is configured to retrieving additional information about the user from a database (e.g., database 218) accessible by server 120 and to render one or more web pages based on the retrieved additional information.

A specific implementation might include having several ATP kiosks along the drive-thru at a restaurant. Currently, all other drivers in line are forced to wait for the person at the front of the line to complete an order before the second in line is even afforded the opportunity to place an order. With ATP kiosks and a large driver-side menu, or perhaps several menus, the process can be streamlined. Instead of serially processing orders, several orders can be executed in parallel, which would result in higher throughput and happier customers. Accordingly, in some embodiments, server 120 is configured to display a webpage on display unit 130 that advertises products available for purchase. Server 120 may also be configured to receive voice input indicative of a purchase request. In various embodiments, the initiating includes providing transaction information to a financial institution (e.g., a bank, credit card company, Paypal, etc.) that includes information about a buyer and the desired product.

ATP system 100, in one embodiment, allows prospective buyers to experience a richer window-shopping experience whereby they are more likely to buy on impulse. For example, storefronts can include display devices that show a telephone number to call; by calling such a number, users can provide input to the ATP system that can customize/control what is displayed on the display devices, which may afford greater advertising opportunities to a retailer or other business. As but one particular example, an apartment leasing office may place a display device in a window that allows a user to view different floor plans. By calling a number of the leasing office, a user may be able select specific floor plans that are subsequently displayed on the display device. Unlike a display in which floor plans might be displayed on a display device on a rotating, periodic basis, an ATP system may allow a user to control what is displayed (e.g., obtain more information about a particular floor plan). ATP may also integrate with online payment technologies, micropayment solutions, or loyalty programs that may use "points."

Another specific implementation might include using ATP to control the displaying of digital pictures/artwork (e.g., in a restaurant). If a person dining in the restaurant likes a particular picture, he or she can interact with embodiments of the disclosed system to obtain additional information regarding the picture (e.g., information about the artist). Optionally, ATP can mediate an anonymous telephone call from the interested buyer to the owner of the artwork, where the contact information for the buyer and the owner are stored in the ATP system 100. If a user later decides to give out his or her number to the other party, the user may approve the release of a real phone number to the user's ATP counterpart. The original painting may be located near the cashier's station where it can be purchased. By rotating paintings throughout the restaurant, each artist gets greater exposure by allowing the paintings' digital representation to hop from table to table over the course of the evening, only pausing at a table if a viewer looks at and interacts with a particular painting. Thus, in some embodiments, ATP system 100 is configured to advertise multiple products on a display device and to provide addition information about specific products upon request from a user viewing the display device.

ATP system 100, in one embodiment, can also function as a conduit for emergency information distribution. For example, ATP system 100 may be configured to display announcement information provided by the Emergency Broadcast System. ATP system 100 may also be configured to reroute calls placed to system 100 to special municipal, state or federal information sources. Thus, a uniform public announcement can be issued across thousands of ATP networked display devices.

ATP system 100, in one embodiment, can be used as an ad-hoc information exchange medium between users. For example, at a convention, attendees may register with system 100 and provide system 100 with information about themselves such as contact information, particular preferences, etc. System 100 may then provide attendees with information about others in attendance. For example, system 100 may provide attendees with an online phone book of phones numbers of other attendees. The listings can be tailored such that people who meet one another can create virtual vCards by entering each other's ATP unique id. In one embodiment, the ATP unique id of a given user might be an attendee's registration number, which is printed on the user's nametag. Thus, in some embodiments, interface server 120 is configured to receive a request from telephony device 110 via interconnect 112, where the request is for information about a user of another telephony device (e.g., contact information such as a vCard), and to provide the requested information to telephony device 110 from a database associated with the server 120 (e.g., database 218).

ATP system 100, in one embodiment, may include a camera coupled to a display device. In one embodiment, system 100 may be configured to use the camera to detect when a user is in front of a display. For example, when no user is in front of a screen of a display device in an airport, ATP system 100 might display an advertisement for ATP or general airport information such as airline-specific flight information. In some embodiments, ATP system 100 may be configured to place video calls between users.

ATP system 100, in one embodiment, may be configured to permit a user to operate an entry device such as a door opener, garage door opener, or gate opener (e.g., at a gated community), etc. This would eliminate the inconvenience of using keypad systems with entry devices. For example, a user might provide an entry code to system 100 via a telephony device 110. Thus, in some embodiments, interface server 120 is coupled to an entry device (e.g., a door opener, gate opener, garage door opener, etc.) such that display unit 130 is configured to display information about the entry device and such that server 120 is configured to receive, from a telephony device 110, a request to open the entry device, to control the entry device, and to indicate whether access has been granted to the entry device (e.g., via interconnect 112 or display unit 130).

ATP system 100, in one embodiment, allows tailored advertising. In various embodiments, the advertisement can be very general or very tailored. If the viewer has a rich profile created, the advertisement may be very specific for that user, unless the user prefers a default advertisement. When the advertisement is customized, coupons and other offerings might be made. Accordingly, in some embodiments, telephony device 110 may provide voice input specifying an identifier of a user of telephony device 110. Server 120 may be configured to use the identifier to retrieve information about the user from a database (e.g., database 218) and to select advertising content to be displayed on a web page, where the selecting is based on the retrieved information about the user.

ATP system 100, in one embodiment, includes a network of one or more screens (e.g., LCDs, plasmas, without limitation). Participating clients may advertise their own products, especially during their normal business hours. Outside these hours, the clients may choose to "rent" or "trade" the ad space with other ATP participants. ATP clients may display the ATP insignia when in idle mode, supporting branding.

FIG. 2 illustrates one embodiment of an interface server 210. As shown, interface server 120 includes a memory 210 storing telephone communication software 212, interface software 214, browser software 216, and a database 218. In various embodiments, telephone communication software 212 receives and digitizes the input from telephony device 110. Then, interface software 214 processes the input and determines a corresponding web page data to be displayed, and browser software 216 then prepares the data for rendering on display unit 130. It is noted that while browser software 216 is shown in interface server 120, browser software 216 may be located elsewhere (e.g., display unit 130).

In one embodiment, telephone communication software 212 operates in response to telephony identifier data transmitted via the telecommunications network coupling telephony device 110 and interface server 120. In some embodiments, telephone communication software 212 implements PBX and IVR functionality using a VoW network. In various embodiments, software 212 accesses hardware installed in the interface expansion slots (not shown) of interface server 120, which enables it to communicate over the PSTN. Telephony information may be intercepted and retransmitted by software 212 to interface software 214. This information may include, but is not limited to, Caller ID, Caller Name, time of call, Called number, Call status and other call detail record (CDR) data that is useful for ATP system 100.

In various embodiments, software 214 receives data from software 212 and processes the data to determine desired web page content. Software 214 may permit a user to change web pages as well as enter data into a web page (e.g., a user may input information that fills in a form on a webpage such as their food order for restaurant's menu web page).

In certain embodiments, software 214 interacts with a database 218. In various embodiments, database 218 is a MySQL Database. In one embodiment, database 218 is implemented as flat file database using unique files to contain data to be sent to browser software 216. Information received from database 218 is processed by software 214 to construct web URLs that rely on the data returned from database 218.

Browser software 216, in one embodiment, processes the web URLs and publishes the rendered webpage to the display unit 130, which is observed by the user. The web URLs effectively redirects the web browser to the desired web page or web script. Browser software 216 may be any of a variety of web browser software including any of Microsoft's Internet Explorer, Mozilla's Firefox and Apple's Safari, etc. These web browsers typically receive the information they render using widely standardized protocols such as HTTP or HTTPS and in formats such as HTML (hypertext markup language) or XHMTL (extensible hypertext markup language). Browser improvements implement by browser software 216 may include the capability to also handle a variety of languages such as, JavaScript, Flash, AJAX and more. AJAX is a technology that prevents the user from having to reload the URL their browser is viewing in order to retrieve new content, as would be necessary when using earlier protocols and technologies. A popular use of AJAX is to update stock prices on a web page automatically without having to reload the entire web page. Not only does this save time and network resources, but it also provides for a better user experience. Because the ATP system 100 works in tandem with telephony device 110 to return dynamic data (in the form of URL selection), display unit 130 may not (or may) have a keyboard or mouse interface to initiate a page reload.

FIG. 3 is one embodiment of a method 300 implemented by ATP system 100. Method 300, in some embodiments, is performed by interface server 120 after server 120 provides a prompt to a user of telephony device 110. The prompt may be a visual prompt provided via display unit 130 such as content displayed in a web page. Alternatively, the prompt may be a voice prompt—e.g., a spoken prompt of an IVR system. In various embodiments, steps may be performed in a different order than illustrated.

In step 310, server 120 receives a call by a user from telephony device 110. In one embodiment, the call is received from a wide-area network such a PSTN, Voice over IP network, etc.

In step 320, server 120 authenticates telephony device 110. In one embodiment, authenticating telephony device 110 includes retrieving profile information about a user of telephony device 110 such as information stored in database 218. In some embodiments, authenticating telephony device 110 includes using a unique identifier provided by a user to select a particular display unit 130 that will interact with a user of telephony device 110. In various embodiments, authenticating telephony device 110 may include establishing a secure unique session for the exchange between telephony device 110 and server 120 (e.g., by lock file or database).

In step 330, server 120 receives voice input from telephony device 110. In some embodiments, the voice input includes speech that is recorded by a microphone of telephony device 110. The voice input may also include a tone signal generated as the result of a key being pressed (e.g., a DTMF tone).

In step 340, server 120 retrieves information associated with the received voice input. In one embodiment, server 120 retrieves URL content associated with an indicated selection. In some embodiments, server 120 retrieves website information usable to render one or more web pages.

In step 350, server 120 sends web page information to display unit 130. In one embodiment server 120 sends the retrieved URL content to a web client (e.g., on display unit 130). In some embodiments, server 120 renders a web page and sends the rendered web page to display unit 130 to be displayed.

Various embodiments for controlling a display of a webpage on a display unit via a telephony device described herein may include storing instructions and/or data implemented in accordance with the foregoing description in an article of manufacture such as tangible computer-readable memory medium, including various portions of memory 210. Certain embodiments of these tangible computer-readable memory media may store instructions that are computer executable to perform actions in accordance with the present disclosure. Generally speaking, such an article of manufacture may include storage media or memory media such as magnetic (e.g., disk) or optical media (e.g., CD, DVD, and related technologies, etc.). The article of manufacture may be either volatile or nonvolatile memory. For example, the article of manufacture may be (without limitation) SDRAM, DDR SDRAM, RDRAM, SRAM, flash memory, and of various types of ROM, etc. In general, any of the methods described herein as being implementable in software may be implemented using program instructions that are stored on various forms of tangible computer-readable media.

Further embodiments of programs described herein may include storing/encoding instructions and/or data on signals such as electrical, electromagnetic, or optical signals, conveyed via a communication medium, link, and/or system (e.g., cable, network, etc.), whether wired, wireless or both. Such signals may carry instructions and/or data implemented in accordance with the foregoing description.

FIG. 4 depicts one embodiment of a computer system 400 for implementing telephony device 110 and/or interface server 120. Telephony device 110 and interface 120 may, of course, be any implemented by suitable type of device. As shown, computer system 400 includes a processor subsystem 480 that is coupled to a memory 420 and I/O interfaces(s) 440 via an interconnect 460 (e.g., a system bus). I/O interface(s) 440 is coupled to one or more I/O devices 450. In some embodiments, interface server 120 is implemented by a computer system 400 such as a server computer system, personal computer system, desktop computer, laptop or notebook computer, mainframe computer system, workstation, network computer, etc. In some embodiments, telephony device 110 is implemented by a computer system 400 such as a handheld computer, a mobile phone, pager, personal data assistant (PDA), etc. Although a single computer system 400 is shown in FIG. 4 for convenience, system 400 may also be implemented as two or more computer systems operating together.

Processor subsystem 480 may include one or more processors or processing units. For example, processor subsystem 480 may include one or more processor units that are coupled to one or more coprocessor units. In various embodiments of computer system 400, multiple instances of processor subsystem 480 may be coupled to interconnect 460. In various embodiments, processor subsystem 480 (or each processor unit within 480) may contain a cache or other form of on-board memory.

Memory 420 is usable by processor subsystem 480. Memory 420 may be implemented using different physical memory media, such as hard disk storage, floppy disk storage, removable disk storage, flash memory, random access memory (RAM-SRAM, EDO RAM, SDRAM, DDR SDRAM, Rambus® RAM, etc.), ROM (PROM, EEPROM, etc.), and so on. Memory in computer system 400 is not limited to memory 420. Rather, computer system 400 may be said to have a "memory subsystem" that includes various types/locations of memory. For example, the memory subsystem of computer system 400 may, in one embodiment, include memory 420, cache memory in processor subsystem 480, and storage on I/O Devices 450 (e.g., a hard drive, storage array, etc.). Thus, the phrase "memory subsystem" is representative of various types of possible memory media within computer system 400. In some embodiments, the memory subsystem stores program instructions executable by processor subsystem 480.

I/O interfaces 440 may be any of various types of interfaces configured to couple to and communicate with other devices, according to various embodiments. In one embodiment, I/O interface 440 is a bridge chip from a front-side to one or more back-side buses. I/O interfaces 440 may be coupled to one or more I/O devices 450 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 400 is coupled to a wide-area network (e.g., a mobile telephone network) via a network interface device.

Various operations described herein may be implemented using program instructions that are executable on the disclosed system. Below is a non-limiting example of program instructions that may be used. It is noted that, in other embodiments, the program instructions may be implemented differently.

Make_Selection.html

This file is an exemplary html that generates the interface presented below.

WELCOME TO»Sentient Network Company

Please select from the following list:

Tip: Please enter your choices by pressing any of the following buttons!

0—to go to Ext 2323

1—to go to Carls Jr's Burgers.com

2—to go to Mercedes Benz.com

3—to go to Greyhound.com

4—to go This Main Menu

Below is the source code for make_selection.html

```html
<html>
<head>
    <link rel="stylesheet" type="text/css" href="css/T2_IVR_main.css" media="screen" />
    <title>Make Selection - Trey Tracker TechConnect </title>
    <meta name="GOOGLEBOT" content="noarchive,index,follow" />
    <meta name="robots" content="noindex,nofollow">
    <script type="text/javascript" src="js/sha1.js"></script>
    <style>
        * {
            margin: 0px;
            padding: 0px;
        }
        body {
            text-align: center;
        }
        #container {
```

```
                width: 500px;
                padding: 0 auto;
                text-align: left;
                margin: 100 auto;
            }
            #ad {
                padding: 3px;
                border: 1px solid #bbb;
                color: #FF1818;
                font-size: 20px;
                margin-top: 0px;
                text-align: center;
            }
            input[type="submit"] {
                color: #000;
                background: #ffa200;
                border: 1px outset #d7b9c9
            }
        </style>
</head>
<body id="type-a">
<form method=post AUTOCOMPLETE="OFF" action=
"http://www.aimbus.com/XML/invitetech3.php">
        <div id="header" >
            <div id="site-name">
                <a href="http://www.aimbus.com" target="_blank"><img
src="images/T2logo.gif"></a>         </div>
        </div>
        <div class="licensetab">
            WELCOME TO »
            Sentient Netwirk Company         </div>
        <h1> Please select from the folowing list : </h1>
            <p><b>Tip:</b> Please enter your choices no more than 5
seconds apart or you will be disconnected!</p>
<br><br>
<br>
<font color=brown>
<p><h1><font color=green>       0 - to go to Ext 2323 </label></font><br></h1>
<p><h1>           1 - to go to Carls Jr's Burgers.com</label><br></h1>
<p><h1>           2 - to go to Mercedes Benz.com</label><br></h1>
<p><h1>        3 - to go to Greyhound.com </label><br></h1>
<p><h1><font color=blue>       4 - to go This Main Menu </label></font><br></h1>
<br>
</font>
<br>
</form>
</body>
<script language="javascript">
<!--
document.forms[0]['T2_username'].focus( );
function submit_handler( ) {
        //var chap = 'a1e1223cc4252e5a7a19027c38e821732997a2ad';
        //var pwdhash = hex_sha1(document.forms[0]['T2_password'].value);
        //var hash = hex_sha1(chap + pwdhash);
        // hide the user's real password or whatever
//alert('debug: submitting data:');
        //document.forms[0]['T2_password'].value = hash;
        if (1>2) {
alert('debug:Not all checks were ok. Cancelling the submission.');
// action="http://www.aimbus.com/XML/invitetech3.php"
        return false;   // only submit if all test passed
        // cancel submitting the form and show warning message
        //document. style= visible;
        } else
        {
alert('debug: All checks work correct. Proceeding to next page...');
// action="http://www.aimbus.com/XML/invitetech3.php"
        return true;
        }
}
-->
</script>
<a href="" id="noie"></a>
</html>
```

Invitetech3.php

This file processes a users input for display using Make_Selection.html. The source code of Invitetech3.php is shown below:

```php
<?php
################################################################################

# For debugging ...

#echo '<pre>';
#print_r ($_POST);
#print_r ($_POST[techname]);
#print_r ($_POST[telephone]);
#print_r ($_POST[invitationcode]);
#echo '</pre>';
################################################################################
# Get user-specific session info
# start session for this user
########### OOPS ! Headers were already sent !
#session_start( );
#if(isset($_SESSION['views']))
#   $_SESSION['views'] = $_SESSION['views']+ 1;
#else
#   $_SESSION['views'] = 1;

#echo "views = ". $_SESSION['views'];
################################################################################
?>
<body bgcolor=#99ffcc>
<?
$myFile = "./sessions/" . $_POST[telephone] . "." . $_POST[invitationcode] . "." . "html";
$myLink = "./sessions/" . $_POST[telephone] . "." . $_POST[invitationcode] . "." . "push-server2.php";
//echo "DEBUG: Push server for this user is: " . $myFile ."\n" ;
$fh = fopen($myFile, 'w') or die("can't open file: [" . $myFile."]");
##$fh = fopen('sessions/test.html', 'w') or die("can't open file: [" . $myFile."]");
# ideally we'd goto the file for the particular user, but for now we might just go to the main push server file
# TVB $stringData = '<meta http-equiv="refresh" content="2;url=http://www.aimbus.com/XML/' . $myLink .'" />';
$stringData = '<meta http-equiv="refresh" content="5;url=http://www.aimbus.com/XML/sessions/push-server2.php' . '" />';
fwrite($fh, $stringData);
# Written to user's html session file
$stringData = "<em> Your technician <font color=green> " . $_POST[techname] . " </font> is preparing a document for you and will be with you in just a moment. </em> <br />";
$stringData = $stringData . "Please click on the <a href=http://www.test.com> link </a> below for important information about this service: <br/>";
$stringData = $stringData . "<a href=http:\\www.aimbus.com/XML/sessions/bookmarklettutorial.html target=_blank > Saving this page in your toolbar tutorial </>";
fwrite($fh, $stringData);
fclose($fh);
create/update a push-server for this user
e.g. http://www.aimbus.com/XML/sessions/trey/5125551212.43232.push-server2.php
$fhi = fopen($myLink, 'w') or die("can't open file");
$stringDataClientPage =" File contents would go here ... ";
$file_to_check = "./sessions/latesttop";
$stringDataClientPage=" <?php  \$client_mt=filemtime(latesttop); do { sleep (1); clearstatcache( ); } while (\$client_mt == filemtime(latesttop)); ?> ";
fwrite($fhi, $stringDataClientPage);
fclose($fhi);
# Create a symbolic link to the template file for this file
# TODO: Does the file actually exist first before linking
$linkcommand = "ln -s pushserver2.php " . $myLink;
##$output = shell_exec($linkcommand);
##sleep(2);
##echo "<pre>$output</pre>";
################################################################################
#################
NOW, wait a while then redirect to correct file per user.
We wait until we detect that the technician has EDIT control of the screen before sending
user on to the guided tour.
$client_mt = filemtime($file_to_check);
print_r("<font color = red><H2>");
print_r("<br><br><br><br><br><br>");
print_r("Waiting for agent to connect ... <br/>");
# Debug print_r($file_to_check);
print_r("</font><H2>");
flush( );
```

-continued

```
do {
    sleep (1);   # sleep until there is a change in the file
    clearstatcache( );
} while ($client_mt == filemtime($file_to_check));  # compare file stat time
Change detected, so new connection established!
# after change detected, user is redirected to a location
# such as : http://www.aimbus.com/XML/sessions/5125551212.44499.html
################################################################################
#################
# Print a message to the user's screen letting them know the connection was established
print_r("<font color = orange><H2>");
print_r("Connection established!");
print_r("</font><H2>");
flush( );   # This line is needed to get everthing printed to the screen before switching pages!
sleep(2);
print_r("<script>");
print_r("document.location.href='".$myFile. "';");
print_r("</script>");
# not reached - sleep(2);
                                ***
```

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer system, comprising:
one or more processors; and
memory storing program instructions executable by the one or more process to cause the computer system to perform operations comprising:
  establishing a data communication channel with a display device;
  establishing, substantially simultaneously with the data communication channel, a voice communications channel over a public switched telephone network (PSTN) or a voice over Internet protocol (VoIP) network with the display device, wherein the voice communications channel is different from a data communication channel;
  causing, over the data communication channel, first content to be presented on the display device;
  receiving, over the voice communication channel, a first input from the display device;
  causing, over the data communication channel, the display device to render a modified version of the first content based at least in part on the first input;
  receiving, over the voice communication channel, an identifier of a user of the display device;
  retrieving, in response to identifying the user, information about the user from a database;
  selecting advertising content based at least in part on the information about the user; and
  causing, over the data communication channel, the display device to render the advertising content.

2. The computer system of claim 1, wherein the operations further comprise determining, via a camera of the display device, that the user is in front of a display of the display device prior to causing the display device to render the advertising content.

3. The computer system of claim 1, wherein the advertising content includes entry data, the entry data usable by the user to access a restricted area.

4. The computer system of claim 1, operations further comprise:
  authenticating the user based at least in part on the identifier of the user; and
  authorizing a third device to receive control inputs from the display device in response to authenticating the user.

5. The computer system of claim 1, wherein the operations are performed by an interface server.

6. The computer system of claim 1, wherein rendering the advertising content includes rendering a web page.

7. The computer system of claim 1, wherein the advertising content includes a visual prompt selectable by the user.

8. The computer system of claim 1, operations further comprise:
  receiving a second input, over the voice communications channel, the second input being a voice input or dual-tone multi-frequency (DTMF) input; and
  performing an option associate with the advertising content in response to receiving the second input.

9. The computer system of claim 1, wherein the first input is a voice input or dual-tone multi-frequency (DTMF) input.

10. A method comprising:
  establishing a data communication channel with a display device;
  establishing, substantially simultaneously with the data communication channel, a voice communications channel with the display device, wherein the voice communications channel is different from a data communication channel;

causing, over the data communication channel, a web page to be presented on the display device;
receiving, over the voice communication channel, an input from the display device;
causing, over the data communication channel, the display device to render a modified version of the web page based at least in part on the input;
receiving, over the voice communication channel, an identifier of a user of the display device;
retrieving, in response to identifying the user, information about the user from a database;
selecting advertising content based at least in part on the information about the user; and
causing, over the data communication channel, the display device to render the advertising content.

11. The method of claim 10, wherein the voice communication channel is a public switched telephone network (PSTN) or a voice over Internet protocol (VOIP) network.

12. The method of claim 10, further comprising authenticating the display device via the voice communication channel.

13. The method of claim 10, further comprising sending the advertising content for display via an additional display device, the additional display device external to the display device.

14. The method of claim 10, further comprising:
accessing information of an entity that created the advertising content; and
establishing an additional communication channel between the display device and an additional device associated with the entity.

15. The method of claim 10, wherein the input is a voice input or dual-tone multi-frequency (DTMF) input.

16. A memory storing instructions executable by one or more processors to cause the one or more processors to perform operations comprising:
establishing a data communication channel with a display device;
establishing, substantially simultaneously with the data communication channel, a voice communications channel with the display device, wherein the voice communications channel is different from a data communication channel;
causing, over the data communication channel, a first content to be presented on the display device;
receiving, over the voice communication channel, an input from the display device;
causing, over the data communication channel, the display device to render a modified version of the first content based at least in part on the input;
receiving, over the voice communication channel, an identifier of a user of the display device;
retrieving, in response to identifying the user, information about the user from a database;
selecting advertising content based at least in part on the information about the user; and
causing, over the data communication channel, the display device to render the advertising content.

17. The memory of claim 16, further comprising sending the advertising content for display via an additional display device, the additional display device being different than the first display device.

18. The memory of claim 16, wherein the information about the user is retrieved from a database.

19. The memory of claim 16, wherein the operations further comprise selecting the display device from among a number of devices based on the identifier as the device to receive the advertising content.

\* \* \* \* \*